June 20, 1967 T. E. BELSHAW ET AL 3,326,116
DOUGHNUT FRYING MACHINE
Original Filed Aug. 19, 1963 4 Sheets-Sheet 1

INVENTORS.
THOMAS E. BELSHAW
WILBUR D. WILKE
BY GLENDON H. SCOTT
ATTORNEYS

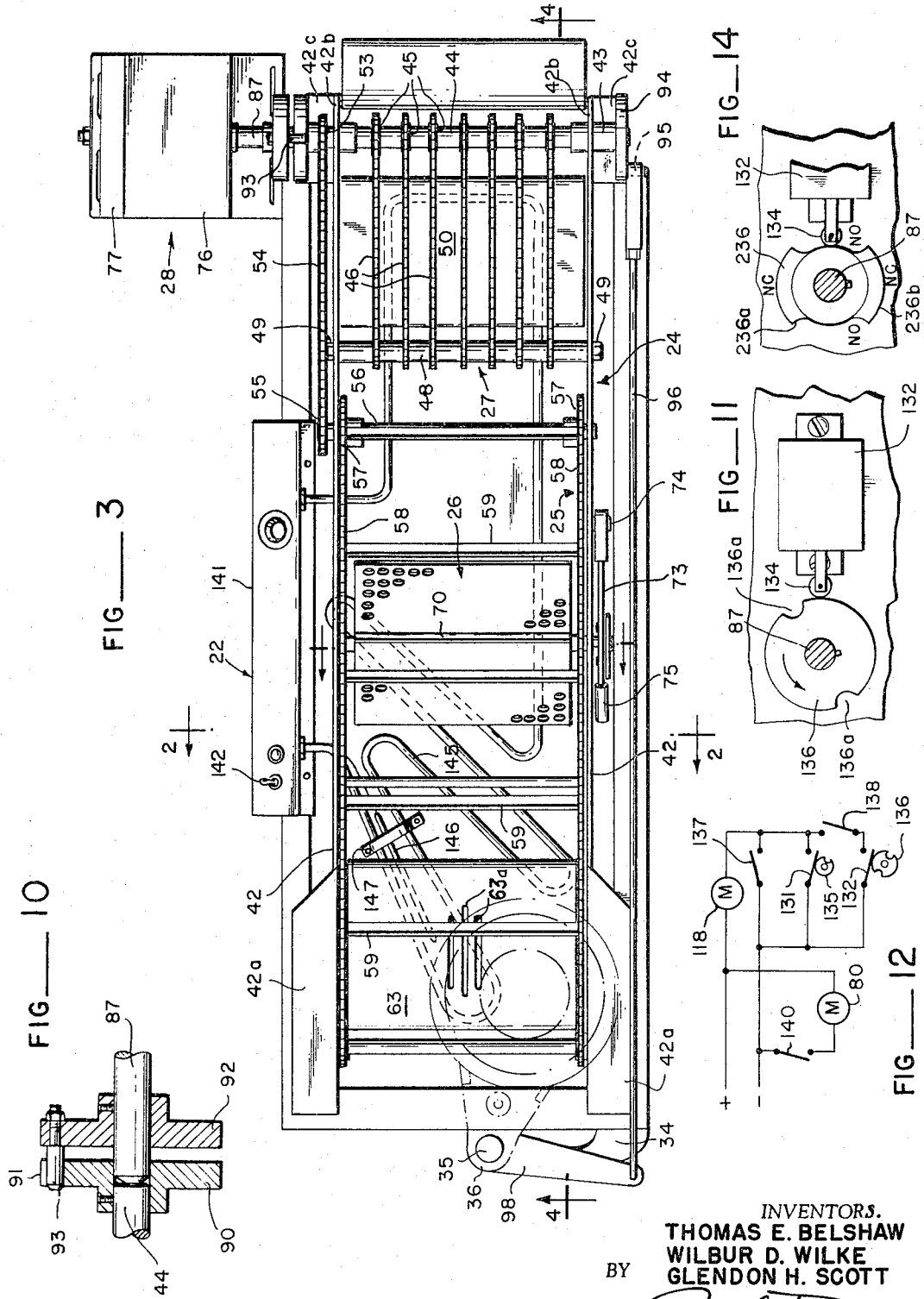

June 20, 1967     T. E. BELSHAW ET AL     3,326,116
DOUGHNUT FRYING MACHINE
Original Filed Aug. 19, 1963     4 Sheets-Sheet 3
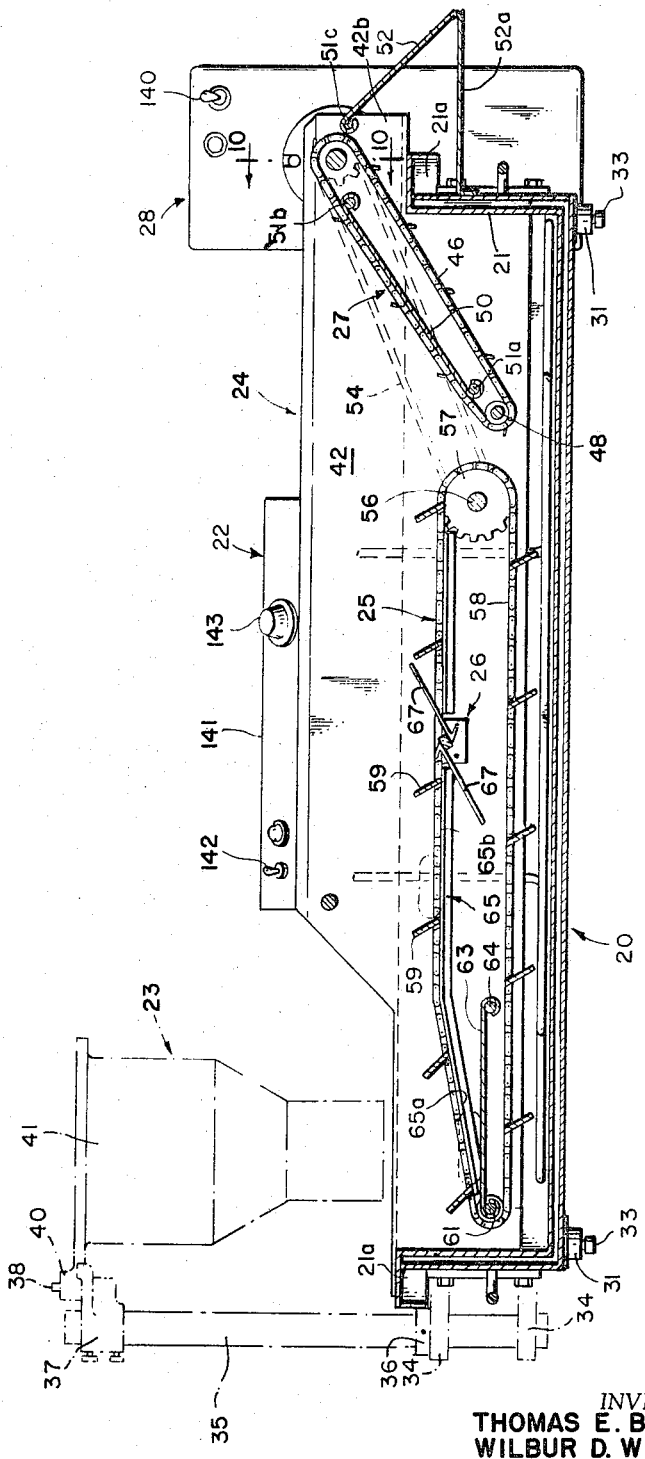
FIG—4
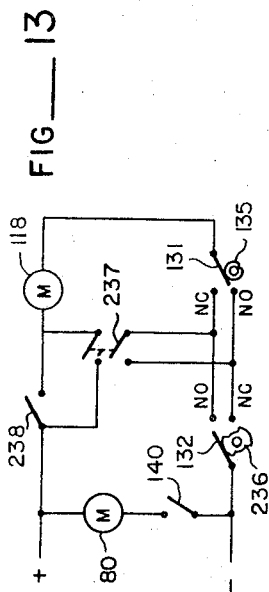
FIG—13
INVENTORS.
THOMAS E. BELSHAW
WILBUR D. WILKE
GLENDON H. SCOTT
BY
Seed Berry
ATTORNEYS June 20, 1967   T. E. BELSHAW ET AL   3,326,116
DOUGHNUT FRYING MACHINE
Original Filed Aug. 19, 1963   4 Sheets-Sheet 4
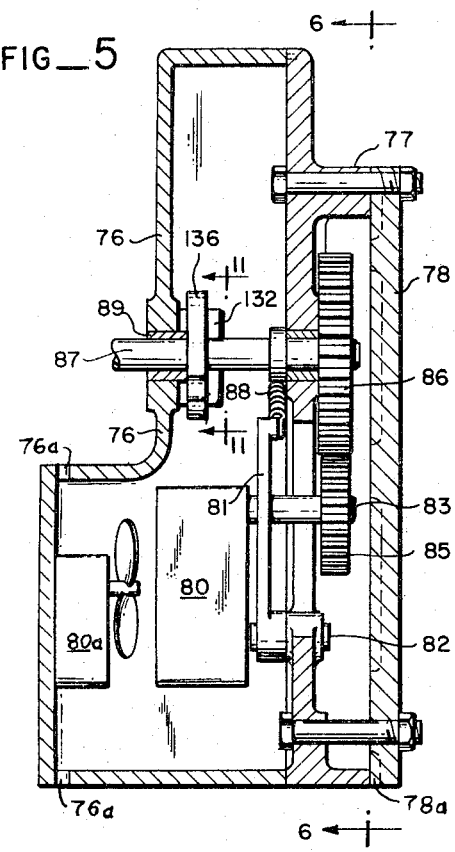
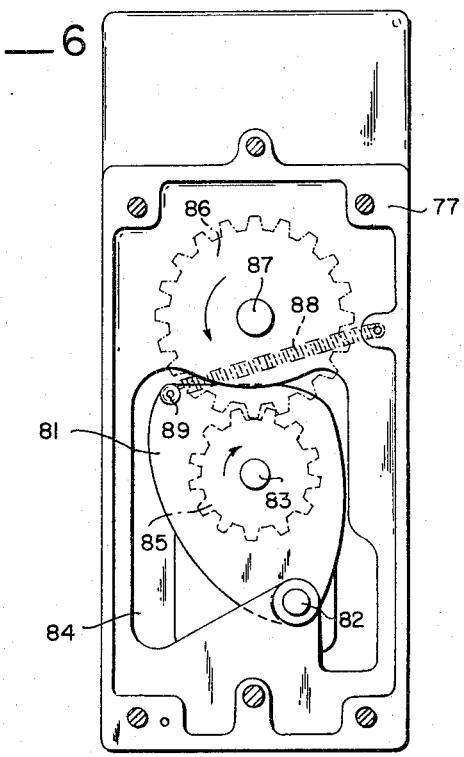
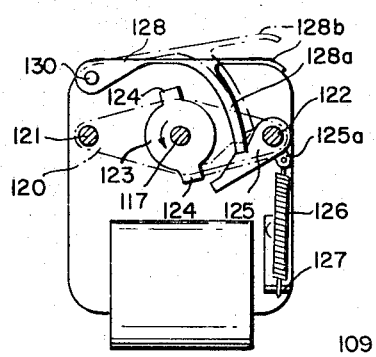
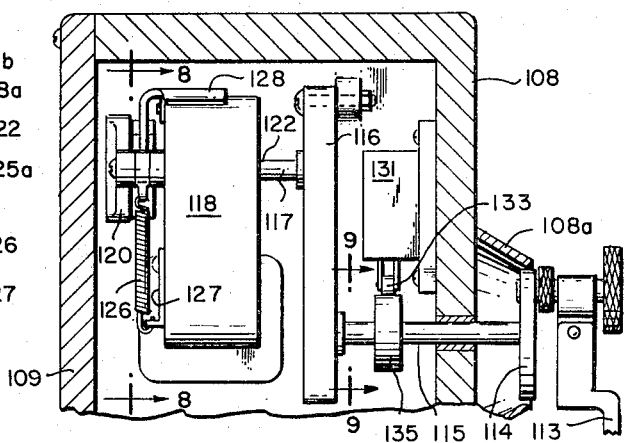
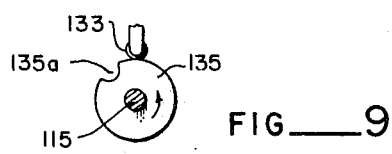
INVENTORS.
THOMAS E. BELSHAW
WILBUR D. WILKE
BY GLENDON H. SCOTT
ATTORNEYS

United States Patent Office 3,326,116
Patented June 20, 1967

---

3,326,116
DOUGHNUT FRYING MACHINE
Thomas E. Belshaw, Wilbur D. Wilke, and Glendon H. Scott, Seattle, Wash., assignors to Belshaw Brothers, Incorporated, Seattle, Wash., a corporation of Washington
Original application Aug. 19, 1963, Ser. No. 302,894. Divided and this application Oct. 15, 1965, Ser. No. 496,556
6 Claims. (Cl. 99—354)

This invention is a division of application Ser. No. 302,894, filed Aug. 19, 1963, now patent No. 3,283,695 which issued Nov. 8, 1966.

This invention relates generally to cooking machines of the type in which bodies to be cooked are fed into a tank of hot cooking liquid and are conveyed through the tank as they cook, and more particularly to automatic doughnut frying machines to which dough rings are cut and dispensed at predetermined intervals into hot fat or oil, are conveyed therethrough while frying, and are then discharged.

An important object of this invention is to provide a doughnut frying machine which can be easily assembled and disassembled for cleaning and has a dough cutter-dispenser which can be readily removed without disturbing the rest of the mechanism.

Another object of this invention is to provide a doughnut frying machine having a dough cutter which automatically swings from side to side dispensing multiple dough rings in laterally spaced relation between the flights of a constantly advancing flight conveyor operating therebeneath.

Another object is to provide a doughnut frying machine having a self-driven dough cutter which is timed without use of mechanical linkage to properly dispense dough rings relative to a constantly moving conveyor driven by a different power unit than that for the cutter.

The invention further aims to provide an automatic doughnut frying machine which is not damaged if the mechanism becomes jammed and which automatically sounds a warning in such an instance.

Other more particular objects and advantages of the invention will, with the foregoing, appear and be understood in the course of the following description and claims, the invention consisting in the novel construction and in the adaptation and combination of parts hereinafter described and claimed.

In the accompanying drawings:

FIG. 3 is a top plan view of the frying machine.

FIG. 4 is a longitudinal vertical sectional view taken on line 4—4 of FIG. 3.

FIG. 5 is a vertical sectional view through the case of the drive unit.

FIG. 6 is a vertical sectional view taken as indicated by the line 6—6 in FIG. 5.

FIG. 7 is an enlarged fragmentary vertical sectional view taken as indicated by line 7—7 in FIG. 1.

Figures 1, 2:
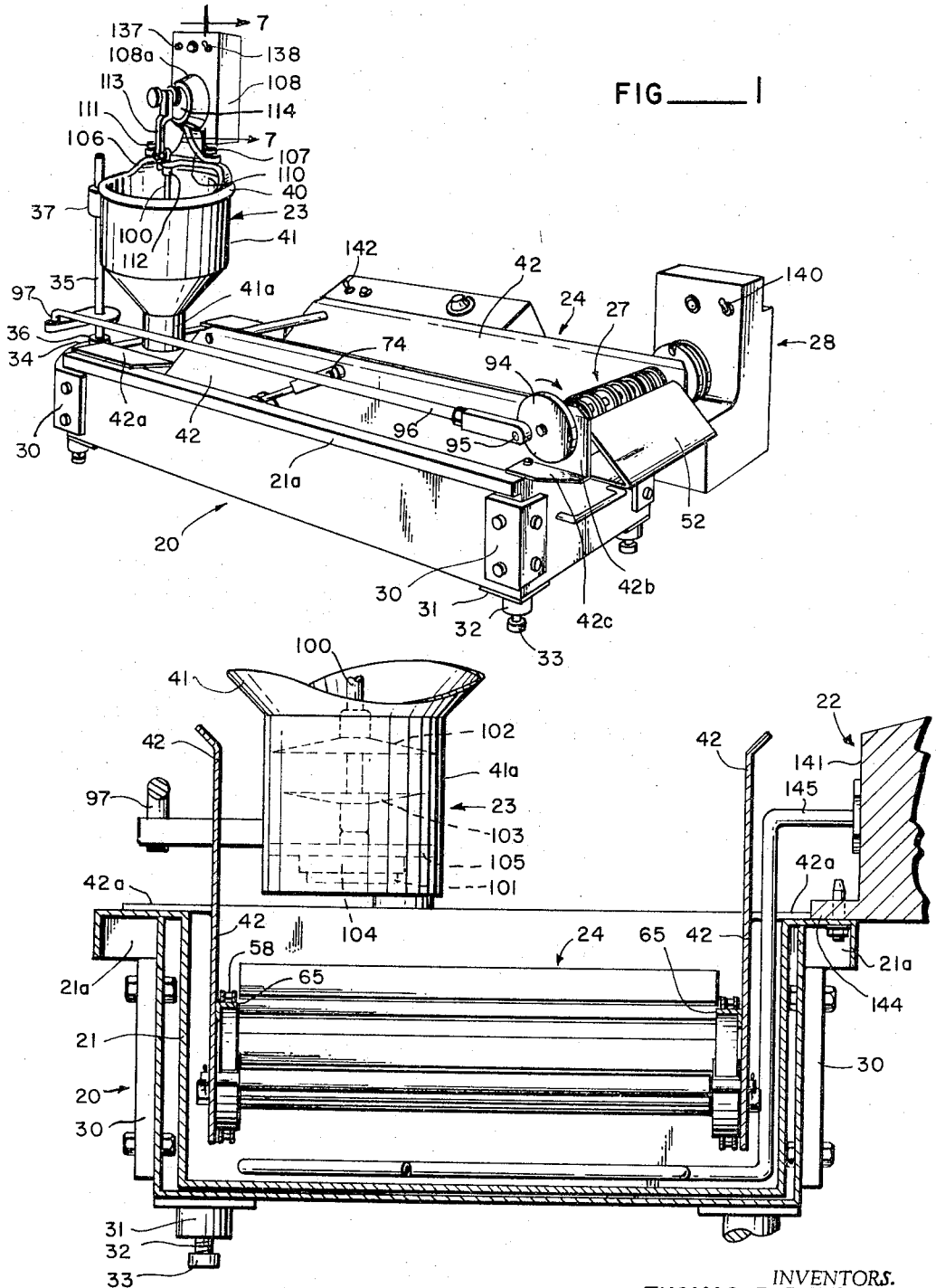
FIG. 1 is a perspective view of a frying machine embodying the present invention.
FIG. 2 is a transverse vertical sectional taken on line 2—2 of FIG. 3.

FIGS. 8 and 9 are detail sectional views taken on lines 8—8 and 9—9, respectively, of FIG. 7.

FIG. 10 is a detail sectional view taken as indicated by line 10—10 in FIG. 4.

FIG. 11 is a detail sectional view taken on line 11—11 of FIG. 5.

FIG. 12 is a schematic of the electrical control circuit for the fryer.

FIG. 13 is a schematic of an alternate electrical control circuit for the fryer.

FIG. 14 is an alternate form cam actuated switch similar to the switch of FIG. 11, to be utilized with the control circuit of FIG. 13.

Referring to the drawings it is seen that in general the illustrated embodiment of the invention has a tank assembly comprising a rectangular base frame 20 in which is seated a removable fryer tank 21 for holding fat and having a removable heating assembly 22 for the fat. A detachable motor-driven dough cutter 23 is swingably mounted at the rear of the base frame and is timed for dispensing dough charges into the tank, alternately from side to side. These dough charges are carried forwardly in the hot fat, turned over about half way through their travel, and discharged at the front of the tank by a removable conveyor unit 24 which includes a cooking flight conveyor 25, a turner 26, and a drain conveyor 27. The conveyor unit is detachably coupled to a drive unit 28 in turn mounted on the base frame 20 near the front. The conveyor unit elements are numbered 43–73 and the heating assembly elements are numbered 141–147, and both are described in co-pending patent application Ser. No. 302,894, filed Aug. 19, 1963, the pertinent portions of which are incorporated herein by reference.

Continuing to a detailed description of these various components of the fryer, the base frame 20 is a tank-like outer case open at the top to receive the tank 21 which has an outturned marginal lip 21a resting on the top of the frame. At the corners the base frame has exterior stiffening angles 30 and bottom pads 31 from which depend legs 32 with adjustable leveling feet 33. The left front angle has the drive unit 28 mounted thereon while the right rear angle is formed with a vertically spaced pair of back eye extensions 34 providing a turn socket for the base of the column 35. This column has an adjustable collar 36 resting on the upper extension and at its upper end has an adapter sleeve 37 with an upstanding noncircular pin 38 for receiving a mating eye presented by a rim piece 40 on the hopper 41 of the dough cutter 23.

The conveyor unit 24 has a pair of longitudinal upright cheek plates 42—42 which have upper rear portions bent laterally out to form back support flanges 42a, and at the front the cheek plates have forward extensions 42b formed by cutouts at the lower front corners of the plates. It will be noted that the material from the upper portion of these cutouts is bent outwardly along the lower edge of extensions 42b thereby forming flanges 42c coplanar with the flanges 42a. As can be seen in FIG. 1, the flanges 42a and 42c seat on the tank lip 21a to support the cheek plates in inwardly spaced relation from the longitudinal side walls of the tank and spaced above the bottom of the tank.

The drive unit 28 comprises a case 76 closed at the back by a gear box 77 in turn having a rear cover plate 78. An electric motor 80 is located in the base portion of the case proper and is carried by a swing plate 81 which is pivoted at its lower end to the front of the gear box 77 by a pin 82. The output shaft 83 of the motor 80 passes rearwardly through the swing plate 81 and through a cutout 84 in the gear box 77 to drive a pinion 85. Surmounting the latter is a gear 86 fixed on a forwardly projecting shaft 87 which is journaled in the case 76 above the motor 80. A tension spring 88 is anchored at one end to the case 76 and is hooked at its other end over a pin 89 at the top of the swing plate 81 to yieldingly pull the pinion 85 into mesh with the gear 86. By this arrangement, if the shaft 87 should become overloaded, the pinion 85 can back sufficiently out of mesh with the gear by swinging of the plate 81 in opposition to the spring 88 to permit the teeth of the pinion to pass the gear teeth. During this action the pinion teeth successively bang against the bottom stationary tooth of the gear as they pass so that the unit becomes a clacker, sounding a warning to the operator that the mechanism is jammed.

Since the electric motor 80 would otherwise tend to overheat during extended periods of operation, because of its confinement within the case 76, cooling and ventilation means are provided within the case 76 by a suitable electric fan unit 80a. In addition, ventilation ports 76a and 78a are provided in the case 76 and the plate 78 respectively. With this arrangement air is caused to circulate about the motor 80 and the interior of the case 76. It will be appreciated that the electric fan unit can be separately controlled by a manual switch, not shown, or may be a part of the motor circuit so as to insure operation during energization of the motor as a matter of choice.

A coupling plate 90, shown in detail in FIG. 10, with a radial peripheral slot 91 on the left end of the front shaft 44 for mating with a coupling plate 92 having an off-center projecting pin 93 adapted to extend into the slot 91. This latter coupling plate 92 is fixed on the forward end of the shaft 87. The other end of the front shaft 44 projects beyond the right cheek plate 42 and drives a crank plate 94 having its crank pin 95 journaled in the forward end of a connecting rod 96. At its rear end this rod is bent downwardly to provide a pintle 97 which extends into a journal formed at the free end of a lever 98 which is fixed on the column 35, as illustrated in FIG. 1. With this arrangement the dough cutter 23 is swung from one side of the tank 21 to the other responsive to a half turn of the shafts 44 and 87. Thus when the connecting rod 96 is at its rearmost position the dough cutter overlies the right half of the tank and when the connecting rod reciprocates to its forwardmost position the dough cutter is positioned to discharge into the left half of the tank.

The dough cutter 23 may take a variety of forms such, for example, as shown in United States Patent No. 2,881,-716, and namely one in which a rod 100 is reciprocated in the hopper 41 and has a forming piston or mandrel 101 and a check valve unit 102–103 at its lower end operating in the necked cylindrical lower end portion 41a of the hopper. At the bottom the latter is a reduced dough discharge tube 104 fixed in an annular end plate 105. The check valve unit comprises a wheel-like component 102 fixed to the rod 100 and a disc-like component 103 floating on the rod between component 102 and the mandrel 101. During each cycle, as the rod moves in a down stroke carrying the valve component 102 and mandrel 101, it slides through the hub of the floating component 103 and a charge of dough is pulled from the hopper 41 into the neck 41a. This charge is isolated when the component 102 reaches the floating component 103 and thereby closes the check valve to isolate the neck from the hopper proper. After closure of the check valve 102–103, the mandrel 101 leaves the discharge tube 104 and further movement of the closed check valve extrudes the charge of dough past the mandrel. As the rod 100 then moves upward on its return stroke the mandrel re-enters the discharge tube 104, a dough ring is cut off, and the valve component 102 leaves the floating component 103. Further upward movement eventually brings the hub of the mandrel against the underside of the hub of the floating component and raises the latter. This upward movement of the floating component draws a new charge of dough from the hopper and through the openings in component 102. The mechanism is then ready for another dough dispensing-cutting cycle. In the present invention such a cycle occurs at each swing limit of the cutter 23.

Referring to FIG. 1, a bail 106 is secured on rim 40 of the hopper 41 and detachably mounted thereon is a motor housing 108 having a rear access cover 109 and a front boss 108a with depending legs 110 which have their feet secured to the bail by thumb screws 111. The bail 106 has a center boss 112 with a vertical through-bore slidably receiving an enlarged head on the upper end of the rod 100 and the front face of this boss is longitudinally slotted to provide an access-way for introducing the shank of the rod during assembly and for receiving a pintle at the lower end of a pitman 113. This pintle makes a pivotal connection between the pitman and the head of the rod 100. At its upper end the pitman has an adjustable-throw pivotal connection with a disc crank 114 located in the mouth of the boss 108a, all in the manner disclosed in Patent 2,881,716. This crank 114 is driven by a shaft 115 from a gear box 116 in the housing 108 giving speed reduction from the shaft 117 of a motor 118. The shaft 117 is journaled at the rear in a cross-head 120 which is held by a pair of screws 121–122 passing through the case of the motor 118 into the case of the gear box 116. This in turn is screw-connected to the housing 108.

Between the cross-head 120 and the motor 118 the shaft 117 has a disc 123 formed with a diametrically opposite pair of radial stop lugs 124 which are arranged to be engaged by a brake pawl 125. This pawl is swingably mounted on the shank of the screw 122 and is yieldingly urged toward braking position by a tension spring 126 which is connected to an ear 125a on the pawl and is anchored to an angle bracket 127 fixed on the motor case. To keep the braking pawl disengaged while the motor 118 is energized a dog 128 is provided having a depending finger 128a arranged to engage the top of the pawl as the dog swings downwardly about a pin 130 on the motor case. Downward swing of the dog is limited by a flange 128b at the top of the dog which is arranged to engage the upper face of the motor case. The motor 118 has a shading ring about one of its poles creating a magnetic pull on the dog 128 sufficient to counter the spring 126 and keep the pawl 125 pushed downwardly out of the path of rotation of the stop lugs 124. Thus, whenever the motor 118 is energized its shaft 117 is free to rotate. Then, whenever the running motor is deenergized the shaft 117 is stopped within half a turn by upward swing of the pawl 125 under force of the spring 126 into engagement with the next approaching of the stop lugs 124. Since the shaft 115 turns at reduced speed relative to the shaft 117 positive stopping of the latter within a half turn after deenergizing of the motor 118 assures that shaft 115 cannot overrun but a few degrees of rotation after the motor is turned off.

The electrical control circuit for the motor 118 includes two self-opening micro-switches 131 and 132, the first being mounted in the housing 108 and the other in the case 76. These switches 131–132 have followers 133–134 tracking on cams 135–136 which are mounted on the shafts 115 and 87, respectively. Cam 135 is generally circular and has a semi-circular cutout portion 135a causing the switch 131 to open once per revolution of the shaft 115, or in other words to open at the conclusion of each operation of the dough cutter. The shape of the cutout portion 135a allows the cam follower to make a decisive movement at the correct instant. On the other hand, cam 136 has a pair of diametrically opposite cutout portions 136e each, when engaged by the follower 134, causing the switch 132 to close with a quick action. The cutout portions 136a are located such that the dough cutter 23 is at one of its swing limits of travel each time the follower 134 reaches one of the cutout portions.

As indicated schematically in FIG. 12, the switches 131 and 132 are wired in respective parallel branches with the cutter motor 118. A third parallel branch contains a manual push button switch 137 located on the housing 108. The branch for switch 132 also contains a manual on-off switch 138 while the other motor 80 has its own power circuit controlled by a second manual on-off switch 140.

To operate the invention, the heating assembly is turned on to heat the fat in the tank 21 up to frying temperature. In the meantime the hopper 41 is filled with dough and the cutter 23 is primed by depressing the push button 137 and holding it closed for a few cycles. When the fat is hot the switch 140 is closed to start the conveyors 25 and 27, and then switch 138 is closed. During each half-revolution of the shafts 87 and 44 the cutter 23 moves by action of the crank 94, connecting rod 96, and lever 98, to one of its two side limits of travel and at the same time the switch 132 is closed by action of the follower 134 in one of the cutout portions 136a. This completes a power circuit to the cutter motor 118 whereupon the shaft 115 is rotated a single revolution to cut and dispense a dough ring into the tank. Near the start of this revolution the shaft 115 rotates the cutout portion 135a from beneath the follower 133 whereupon the switch 131 is closed by action of the high part of the cam 135 on the follower. This occurs before the cutout portion 136a moves from beneath the follower 134 so that the power circuit for the cutter motor 118 moves without interruption from the branch which has the switches 132 and 133 to the branch containing the switch 131. At the close of the revolution of the shaft 115 the cutout portion 135a again moves beneath the follower 133 causing the switch 131 to open and shut off the cutter motor 118 which is then braked by action of the pawl 125 against one of the stop lugs 124 in the manner aforedescribed. During this action of the cutter 23 the conveyors remain in operation and so there is a slight swing movement of the cutter. However, it is negligible since the cutting-dispensing cycle can be only about one-half a second compared to a time increment between passage of successive flights of the conveyor 25 of about fifteen seconds. The timing of the machine is such that the crank 94 turns a revolution to move the cutter in the full swing cycle (from one side of the tank to the other and back) during the flight time increment so that two dough rings are dispensed in side by side relation between successive flights. The trailing of these flights then engages both dough rings to conduct them through the bath of fat.

When the cooking dough rings reach the turner 26 they are engaged from beneath by one of the rotating flipper arms 67 and are gently turned end for end as they are conveyed along. This turning action submerges the lesser cooked side of the dough rings so that by the time the dough rings reach the discharge end of the flight conveyor 25 they are substantially evenly cooked. They then float into engagement with the sloped upper course of the drain conveyor 27 and are carried thereby out of the fat and up the ramp 50 during which time they drain into the tank. At the top of the drain conveyor 27 the fried doughnuts drop onto the chute 52 and slide away from the fryer for packaging or other processing.

An alternate form of electrical control circuit, designed for cooperation with a modified form of the cam operated micro-switch carried by the power shaft 87, is illustrated in FIGS. 13 and 14. In the modified form only the shape of the cam 136 is changed with the modified form of the cam being designated by numeral 236 in FIG. 14. The modified cam 236 is mounted for rotation on the shaft 87 and cooperates with the cam follower 134 and micro-switch 132 in substantially the same manner as described for the cam 136 except for the motion imparted to the follower by the modified cam surface wherein the switch is normally opened by the recessed portions of the cam. It will be understood that the configuration and function of the cam 135, mounted on the shaft 115 of the cutter motor, FIG. 9, remains the same in the modified form of control circuit. In describing the modified form of control circuit shown in FIG. 13 like reference numerals are used to identify the identical elements referred to in the preferred embodiment of the invention.

Referring to FIG. 14, the cam 236 is formed with two identical oppositely positioned recesses 236a which hold the switch 132 in normally open position, and identical oppositely positioned cam lobes 236b which hold the switch 132 in normally closed position. The constantly rotating cam 236 thus operates to maintain the switch 132 in either normally open position or normally closed position, with the peripheral extent of the lobes 236b being equal to the extent of the recesses 236a so that the duration of the open condition of switch 132 is substantially equal to the duration of the closed condition.

The cams 236 and 135 are shown schematically in the circuit in FIG. 13 and cooperate with micro-switches 132 and 131 respectively as illustrated. In the modified circuit each of the switches 132 and 131 have normally open positions designated as NO and normally closed positions designated as NC with the NO contact of switch 132 being connected to the NC contact of switch 131 and the NC contact of switch 132 being connected to the NO contact of switch 131. The conveyor motor 80 is connected in the same manner as illustrated in the preferred embodiment with the manual switch 140 serving to control its actuation. A master override control for the circuit is provided by the double pole manual switch 237 which corresponds to the overside switch 137 of the preferred embodiment. A second single pole manual switch 238 is provided between one lead from the power source and the cutter motor 118 and serves to break the circuit to motor 118 when the override switch 237 is open so as to prevent operation of the motor 118 by the action of the cam switches 131 and 132. The switch 238 corresponds in function to the switch 138 in the preferred embodiment.

Since at least one of the lines connecting the respective contacts of switches 132 and 131 will always be connected to one side of the power source, depending on the position of the cam 236, closing of the switch 237 will serve to bridge the two lines between switches 132 and 131 and thus pass current to one side of motor 118. Closing of switch 237 also bypasses switch 238 to complete the circuit through the motor 118 regardless of the position of switch 238. In this manner switch 237 acts as a priming control for the circuit, much in the manner described for the switch 137 in the preferred embodiment, to operate the device for a few cycles prior to the take-over of the cam switches.

The operation of the modified control circuit and cam switch will now be described with reference to FIGS. 9, 13 and 14. After the motor 80 has been started by closing the switch 140 and the circuit has been primed by closing the overide switch 237 to operate the cutter mechanism for a few cycles, the switch 237 is again opened and the cam switches take over.

Due to the action of the braking device of the other motor 118 previously described, the cam 135 will always leave the micro-switch 131 in the NO or normally open position shown in FIG. 13 when the cutter motor stops. Starting the cycle from this position with the manual switch 238 closed, the cam 236 rotates until the follower 134 engages the lobe 236b on the cam. This action moves the follower 134 to cause the switch 132 to engage the NC contact which is connected to the NO contact of switch 131 and a circuit is completed to run the motor 118. The cutter motor 118 rotates the cam 135 and the follower 133 moves out of the cut-out portion 135a to move the switch 131 to the NC position. By this time the switch 132 has moved to the NO position by action of the follower 134 moving into the recess 236a on cam 236. Since the NO contact of switch 132 is connected to the NC contact of switch 131, the cutter motor 118 continues to rotate until the cam 135 has moved one revolution. At the end of one revolution of the cam 135 the follower 133 moves into the recess 135a and the switch 131 is moved to the NO position to break the power circuit to stop the motor 118. When the switch 131 moves to the NO position, the follower 134 is still engaging the recess 236a of the cam 236 so that the switch 132 is also in the NO position. As soon as the cam again moves the switch 132 to the NC position the above cycle repeats. It will be noted that the timing of the rotation of the cam 236 and the extent of the recess 236a are sufficient to allow the cutter motor 118 to complete one revolution before starting another cycle.

With the embodiment of the control circuit just described, any chance of double dropping by continued operation of the cutter device, after motor 80 is de-energized is completely eliminated since, regardless of the stopping position of cam 236, the cam 135 will always stop the motor 118 after one revolution. To illustrate; if the cam 236 is stopped with the follower 134 anywhere along the lobe 236b, so as to leave the switch 132 in the NC position, the switch 131 is in the NO position, the follower 133 will merely move out of the cut-out portion 135a a sufficient distance to move the switch 131 to the NC position, at which point the entire circuit is broken. Likewise, if the cam 236 is stopped with the follower 134 anywhere along the recess 236a, so as to leave the switch 132 in the NO position, and the switch 131 in the NC position, the motor 118 will complete its revolution and the follower 133 will engage the recess 135a to move switch 131 to the NO position, at which time the entire circuit is broken.

It will be understood that the cooperation between the doughnut dropping cycles and the conveyor operation when utilizing the modified form of control circuit is the same as that described in conjunction with the preferred embodiment and hence is not repeated.

The frying machine of the present invention can be quickly disassembled in units for cleaning without the use of any tools. Plug fittings are used on the electrical connections for the cutter motor 118 and related control circuit. Accordingly, at any time dough cutter 23 can be easily electrically disconnected and lifted free of the column 55. The rear end of the connecting rod 96 can be disconnected simply by lifting the pintle 97 from the lever 98 and then the entire conveyor unit 24 is free to be lifted from the tank 21 and cocked to uncouple the pin 93 from the slot 91. Disassembly can then be completed merely by lifting the heater 22 from the tank, and in turn lifting the tank out of the base frame 20.

Although doughnuts have been described as being introduced by a cutter means into the fryer, it is evident that means such as a proofer could be used and controlled in the same manner as the above-described cutter such that doughnuts are introduced into the fryer with each revolution of the conveyor drive shaft and the dough introducing means advanced a station, but it should also be noted that the doughnut cutting operation of other cutters could be controlled in the same manner as the above-described cutter.

It is thought that the invention will have been clearly understood from the foregoing detailed description. Changes in the details of construction will suggest themselves and may be resorted to without departing from the spirit of the invention, wherefore it is my intention that no limitations be implied and that the hereto annexed claims be given a scope fully commensurate with the broadest interpretation to which the employed language admits.

What is claimed is:
1. In combination, a tank, conveyor means in said tank having a first drive shaft, dough cutter means overlying said tank including an electric motor and a second drive shaft, and first drive means interconnecting said drive shaft with said cutter means for operating said dough cutter means responsive to each rotation of said first drive shaft including a first cam operatively associated with said first shaft, a second cam operatively associated with said second shaft, and an electric control circuit including switch means actuated by the first and second cams to control the sequence of operation of said cutter means.

2. The combination of claim 1 wherein said cutter means is swingably mounted to oscillate between opposite sides of the tank near one end of said conveyor means, in which said drive means comprises a crank on said drive shaft, a horizontal lever on said dough cutter means, and a connecting rod pivotally connected to said crank and lever such that said cutter means oscillates back and forth responsive to each rotation of said first drive shaft.

3. In combination, a tank, conveyor means in said tank including a first live rotary shaft, means for introducing food products to be cooked into said tank, the introducing means having an electric motor and a second live rotary shaft which turns one revolution during each cycle of said introducing means, a first cam operatively associated with said first shaft, a second cam operatively associated with said second shaft, a motor-starting switch closed by action of said first cam once for each said station during each rotation of said first shaft, a motor-stopping switch opened by action of said second cam during a minor part only of each rotation of said second shaft, and an electric power circuit for said motor having said switches wired in parallel to one another in one of the power leads for the motor.

4. The combination of claim 3 in which drive means operatively interconnects said first shaft with said introducing means whereby said introducing means is advanced responsive to a single rotation of said first shaft such that food products are introduced to said tank with each revolution of said first shaft.

5. In combination, a tank, conveyor means in said tank including a first live rotary shaft, cutter means operatively overlying said tank and movably mounted to move between given cutting stations, said cutter means having an electric motor and a second live rotary shaft which turns one revolution during each cutting cycle of said cutter means, a first cam operatively associated with said first shaft, a second cam operatively associated with said second shaft, a motor-starting switch held successively in a noramlly open and a normally closed position by the action of said first cam once for each said station during each rotation of said shaft, a motor-stopping switch held in a normally opened position by the action of said second cam during a minor part only of each rotation of said second shaft and held in a normally closed position during the remaining portion of each said rotation, and an electric power circuit for said motor having said switches wired in series in one of the power leads of said motor with the normally open and normally closed contacts of said first switch being connected respectively to the normally closed and normally open contacts of said second switch, whereby the power circuit of said motor will be broken after each revolution of said motor regardless of the stopping position of said first cam.

6. The combination according to claim 5 including an override switch means in said electric power circuit for operating said motor regardless of the positions of said first and second cams.

References Cited
UNITED STATES PATENTS

| 1,686,596 | 10/1928 | Betz | 89—405 XR |
| 1,961,532 | 6/1934 | Snyder | 99—354 |
| 2,095,731 | 10/1937 | Carpenter | 99—354 |
| 2,107,325 | 2/1938 | Carpenter | 99—354 |
| 2,191,284 | 2/1940 | Morris | 99—354 |
| 2,201,364 | 5/1940 | Carpenter | 99—405 |
| 2,229,167 | 1/1941 | Carpenter | 99—354 |
| 2,463,112 | 3/1949 | Kipnis | 107—54 |
| 2,917,008 | 12/1959 | Kipnis | 107—14 |
| 2,966,840 | 1/1961 | Forsyth | 99—354 |

BILLY J. WILHITE, *Primary Examiner.*